(12) United States Patent
Tezuka et al.

(10) Patent No.: US 8,812,142 B2
(45) Date of Patent: Aug. 19, 2014

(54) NUMERICAL CONTROLLER OF MACHINE TOOL HAVING SOUND CONVERTING UNIT

(75) Inventors: Junichi Tezuka, Yamanashi (JP); Hajime Ogawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 134 days.

(21) Appl. No.: 13/494,079

(22) Filed: Jun. 12, 2012

(65) Prior Publication Data

US 2013/0030558 A1    Jan. 31, 2013

(30) Foreign Application Priority Data

Jul. 26, 2011    (JP) ................................. 2011-163365

(51) Int. Cl.
    *G06F 17/00*    (2006.01)
(52) U.S. Cl.
    USPC .......................................................... 700/94
(58) Field of Classification Search
    USPC .......................................................... 700/94
    See application file for complete search history.

(56) References Cited

U.S. PATENT DOCUMENTS

| | | | | |
|---|---|---|---|---|
| 5,144,212 | A * | 9/1992 | Izawa et al. ................... | 318/569 |
| 5,893,987 | A * | 4/1999 | Yamazaki et al. ....... | 219/121.61 |
| 6,502,045 | B1 * | 12/2002 | Biagiotti ......................... | 702/66 |
| 6,549,824 | B1 * | 4/2003 | Satou et al. .................... | 700/162 |
| 6,721,621 | B1 * | 4/2004 | Naka et al. ..................... | 700/162 |
| 6,981,417 | B1 * | 1/2006 | Oravecz .......................... | 73/619 |
| 8,478,438 | B2 * | 7/2013 | Nishibashi ..................... | 700/159 |
| 2004/0236450 | A1 * | 11/2004 | Bryant et al. .................. | 700/108 |
| 2005/0082267 | A1 * | 4/2005 | Nagai et al. ............... | 219/121.82 |
| 2005/0276466 | A1 * | 12/2005 | Vaccaro et al. ............... | 382/152 |
| 2006/0262876 | A1 * | 11/2006 | LaDue ........................... | 375/295 |
| 2007/0196190 | A1 * | 8/2007 | Bourne et al. ................ | 409/131 |
| 2009/0248194 | A1 * | 10/2009 | Lammering et al. .......... | 700/173 |
| 2009/0261990 | A1 * | 10/2009 | Wu et al. ........................... | 341/20 |
| 2011/0015877 | A1 * | 1/2011 | Okita et al. ..................... | 702/41 |
| 2011/0137448 | A1 * | 6/2011 | Scherer ......................... | 700/173 |

FOREIGN PATENT DOCUMENTS

| | | |
|---|---|---|
| JP | 06-102921 | 4/1994 |
| JP | 11-278041 | 10/1999 |
| JP | 2004178447 A | 6/2004 |

* cited by examiner

*Primary Examiner* — Paul McCord
(74) *Attorney, Agent, or Firm* — Lowe Hauptman & Ham, LLP (57) ABSTRACT

A numerical controller, wherein an operator, even remotely, can recognize a sound of a machine tool or the like, and can intuitively know the effect in adjusting the parameter. The numerical controller includes a drive axis controlling part configured to control a drive axis; a drive axis data storing part configured to obtain a physical quantity of the drive axis as time-series data and store the time-series data; a displaying part configured to convert the time-series data into a predetermined indication form and display the data as at least one displayed waveform; a selecting part configured to select the displayed waveform by input operation of the operator; a sound converting part configured to convert the selected waveform into sound conversion data, a type of which is capable of being output as sound; and a sound outputting part configured to output the generated sound conversion data as sound.

8 Claims, 8 Drawing Sheets

NUMERICAL CONTROLLER OF MACHINE TOOL HAVING SOUND CONVERTING UNIT

RELATED APPLICATIONS

The present application is based on, and claims priority from, Japanese Application Number 2011-163365, filed Jul. 26, 2011, the disclosure of which is hereby incorporated by reference herein in its entirety.

BACKGROUND OF THE INVENTION

1. Field of the Invention

The present invention relates to a numerical controller having a sound converting unit, used in a machine tool.

2. Description of the Related Art

In the prior art, in order to evaluate the motion of a drive axis of a machine tool, a device, for displaying physical quantities such as the position, the speed and the acceleration of each axis on a monitor, has been used. Such a device is used along with an analyzing process such as frequency analysis, in order for an operator to more effectively evaluate and adjust the motion. For example, Japanese Unexamined Patent Publication (Kokai) No. 2004-178447 discloses a technique for converting a measured value obtained by a sensor part into information which is easily recognized by an operator for adjusting parameters, whereby the operator can understand the state of a mechanical device.

Generally, the evaluation and adjustment of the motion of the drive axis is carried out by visually analyzing data displayed on a display. However, other than the visual information, auditory information, such as oscillation sound or resonation sound, is also useful. Since the auditory information includes characteristic parameters such as a frequency and a sound volume, unlike the visual information, the auditory information can be understood more intuitively than the visual information. However, in order to hear the sound of the mechanical device, the operator must stay in the vicinity of the mechanical device. Further, in order to know an effect due to the adjustment of a filter used for reducing the oscillation and/or resonation of the device, it is necessary to recognize the sound of the device or carry out the frequency analysis relating to obtained data.

In Japanese Unexamined Patent Publication (Kokai) No. 2004-178447, vibration having amplitude and frequency equivalent to the maximum amplitude and oscillation cycle of the measured values, or sound having sound volume and frequency equivalent to the maximum amplitude and oscillation cycle of the measured values, is presented to the operator, and then the operator adjusts the machine based on the presented vibration or sound. However, Japanese Unexamined Patent Publication (Kokai) No. 2004-178447 does not disclose that the displayed waveform is converted into the sound, that the sound after the parameter adjustment is simulated, and that the sound is synthesized from a plurality of waveforms which are arbitrarily selected.

SUMMARY OF THE INVENTION

An object of the present invention is to provide a numerical controller having a sound converting means, so that the operator, even remotely, can recognize the machine sound of the machine tool or the like, and can intuitively know the effect in adjusting the parameter.

According to one aspect of the present invention, a numerical controller for a machine tool is provided, comprising: a drive axis controlling part configured to control a drive axis of the machine tool; a drive axis data storing part configured to obtain a physical quantity of the drive axis as time-series data, and store the time-series data; an displaying part configured to convert the time-series data into a predetermined indication form and display the data as at least one displayed waveform; a selecting part configured to select the waveform displayed on the displaying part by input operation; a sound converting part configured to convert the waveform selected by the selecting part into sound conversion data, a type of which is capable of being output as sound; and a sound outputting part configured to output the sound conversion data, generated by the sound converting part, as sound.

In a preferred embodiment, the numerical controller further comprises a simulating part configured to estimate time-series data obtained when a parameter relating to the control of the drive axis is changed, based on the parameter before being changed, and calculate the time-series data as estimated time-series data, wherein the displaying part converts the estimated time-series data calculated by the simulating part into a predetermined display form, and displays the converted data as a displayed waveform.

In a preferred embodiment, the sound converting part generates synthesized sound data by synthesizing two or more displayed waveforms selected by the selecting part.

In a preferred embodiment, the selecting part is capable of selecting a partial region of the displayed waveform displayed on the displaying part, and the sound converting part converts only the partial region of the displayed waveform selected by the selecting part into sound conversion data.

In a preferred embodiment, the sound converting part generates sound conversion data wherein amplitude of a predetermined frequency is changed with a predetermined magnification by using frequency analysis.

In a preferred embodiment, the sound converting part generates sound conversion data wherein a frequency of the sound conversion data is arbitrarily shifted by using frequency analysis.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
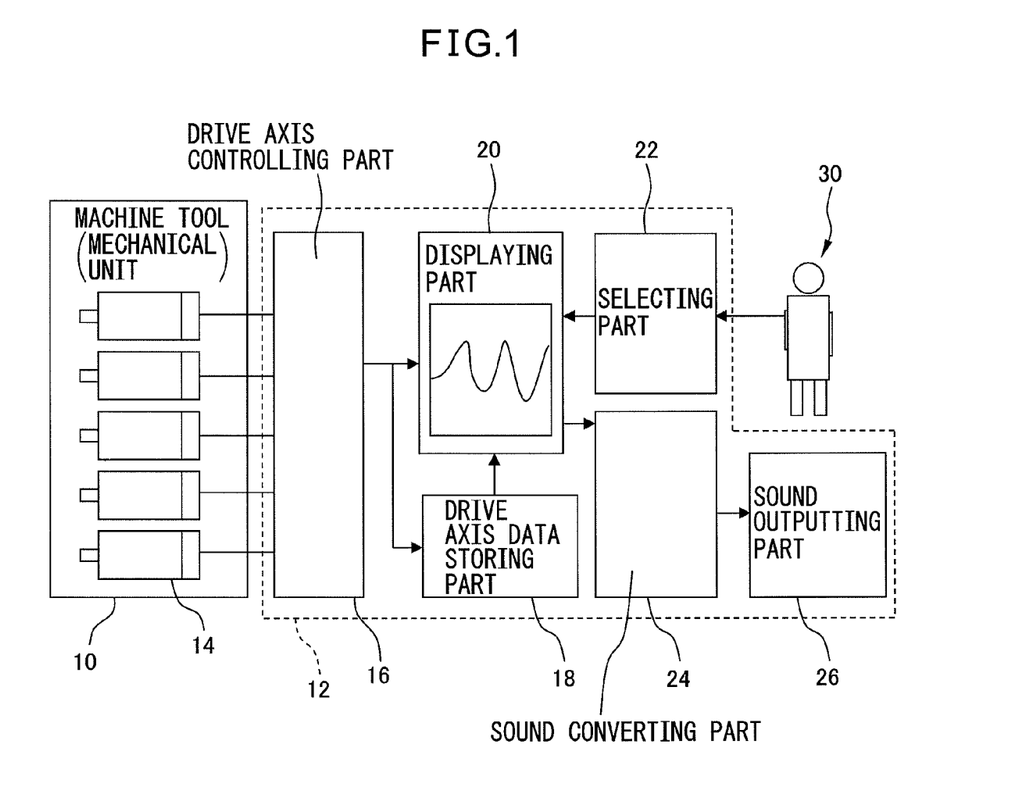
FIG. 1 shows a configuration of a numerical controller of a machine tool according to a first embodiment of the present invention.

FIG. 1 shows a schematic configuration of a numerical controller 12 used to control a machine tool (or a mechanical unit) 10, according to a first embodiment of the present invention. Numerical controller 12 has a drive axis controlling part 16 configured to control a drive axis 14 (such as a servomotor for driving each axis) of machine tool 10; a drive axis data storing part 18 configured to obtain a physical quantity (such as the position and current) of drive axis 14 as time-series data, and store the time-series data; an displaying part 20 configured to convert the time-series data into a predetermined indication form, and display the data as at least one displayed waveform. As the physical quantity of drive axis 14, a commanded value generated by drive axis controlling part 16, or, a measured value (output value) from an encoder or the like (not shown) which measures the physical quantity of drive axis 14, may be used.

Numerical controller 12 also has a selecting part 22 configured to allow an operator 30 to select the waveform displayed on displaying part 20 by input operation; a sound converting part 24 configured to convert the waveform selected by selecting part 22 into sound conversion data, a type of which is capable of being output as sound; and a sound outputting part 26 configured to output the sound conversion data, generated by sound converting part 24, as sound.

Figure 2:
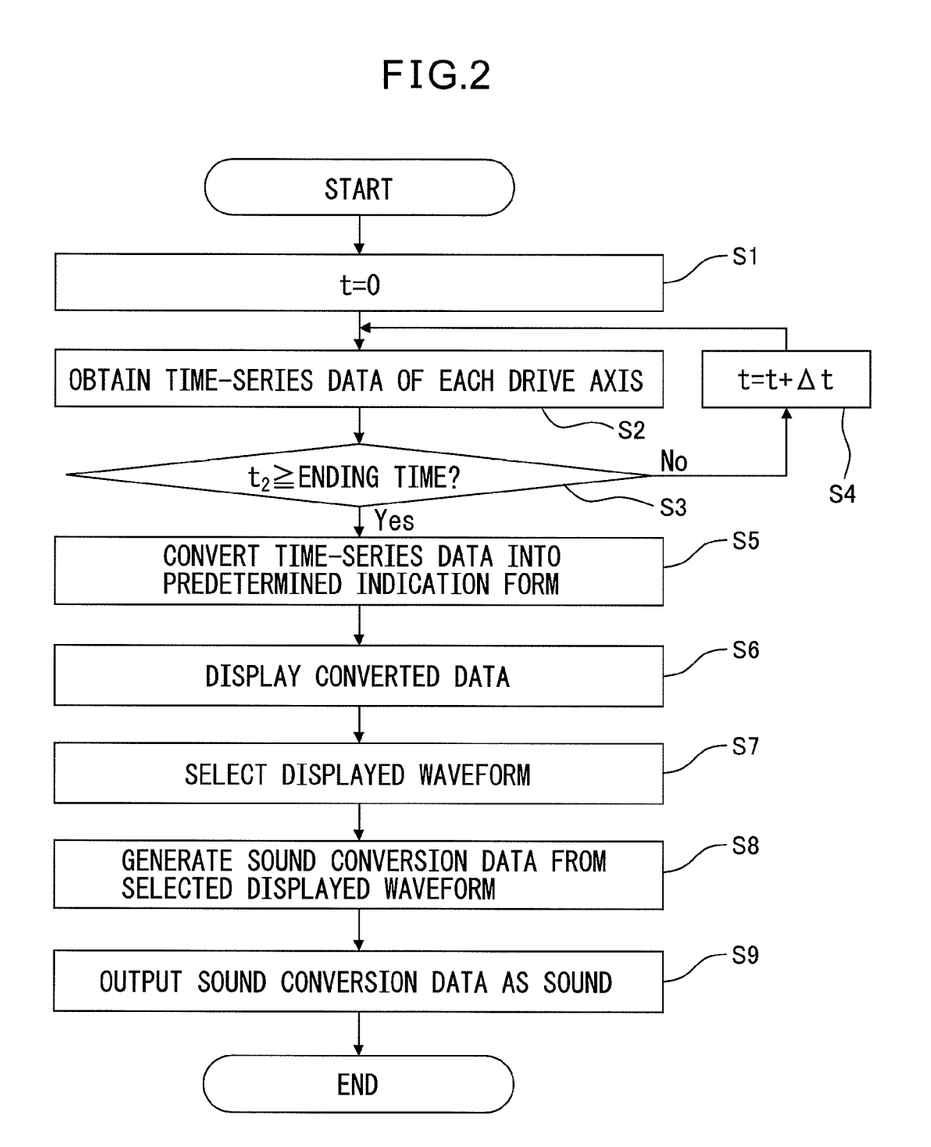
FIG. 2 shows a flowchart explaining the procedure in the first embodiment.

Next, the procedure by means of numerical controller 12 is explained with reference to FIGS. 2 and 3. First, a time point "t" is set to zero (step S1), and a time-series data of physical quantity such as the position, the speed, the acceleration, and/or the current of each drive axis, are obtained (step S2). The process of step S2 is repeated until time point t reaches a predetermined ending time point (steps S3 and S4).

Figure 3:
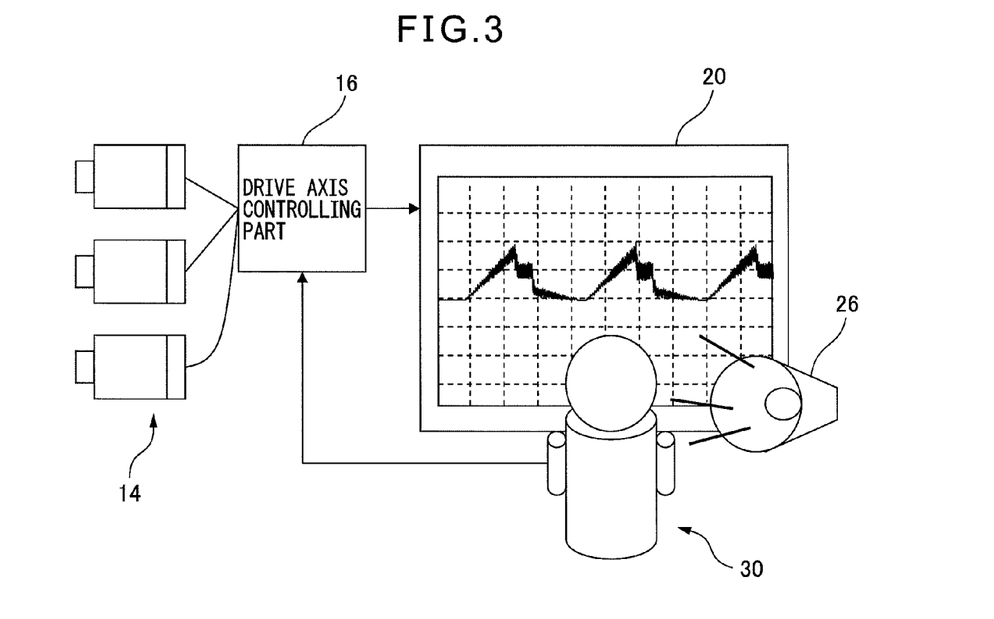
FIG. 3 shows an example wherein an operator adjusts a parameter by using the numerical controller of the first embodiment.

Then, in order to display the time-series data obtained from each drive axis on displaying part 20, the time-series data is converted into a predetermined indication form (step S5), and the converted time-series data is displayed on displaying part 20 in the shape of a graph or the like (step S6 and FIG. 3).

Next, the operator carries out input operation with respect to selecting part 22, so as to select a waveform displayed on displaying part 20 (step S7). This selection may include selecting at least one waveform from a plurality of displayed waveforms, and selecting a partial region of one waveform. Therefore, the "selected displayed waveform" used in the present invention may include at least one waveform selected from a plurality of displayed waveforms, and the partial region extracted from one waveform.

Next, based on the selected displayed waveform, sound conversion data, capable of being output as sound, is generated (step S8), and then the sound conversion data is output as sound (step S9).

In the conventional adjustment of a drive axis, data obtained from the drive axis is displayed on a display or the like. Then, an operator analyzes the waveform displayed on the display, visually or by using frequency analysis, and extracts information required for the adjustment from the displayed waveform, in order to adjust the drive axis based on the extracted information. Therefore, in the prior art, the information available for the operator is primarily visual information, and it is difficult to remotely utilize the sound information such as oscillation sound or resonation sound. On the other hand, in the present invention, as shown in FIG. 3, the physical quantity of drive axis 14 relating to the sound information, such as the position and current thereof, is displayed on displaying part 20 as the displayed waveform, and then the displayed waveform is converted into the sound and is provided to operator 30 by means of sound outputting part 26 such as audio means. By virtue of this, the operator can understand the information aurally and intuitively. By providing the displayed waveform to the operator as the sound, the auditory information can be also used, as well as the visual information, whereby the operator can effectively adjust a parameter for controlling the drive axis.

Figure 4:
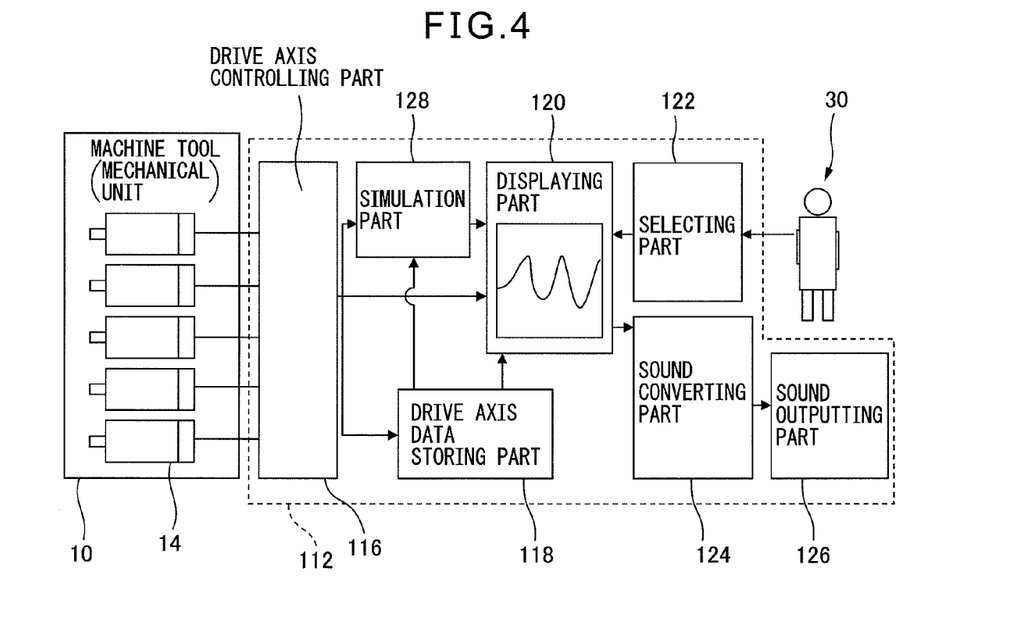
FIG. 4 shows a configuration of a numerical controller of a machine tool according to a second embodiment of the present invention.

FIG. 4 shows a schematic configuration of a numerical controller 112 used to control machine tool (or a mechanical unit) 10, according to a second embodiment of the present invention. Numerical controller 112 has a drive axis controlling part 116 configured to control drive axis 14 (such as a servomotor for driving each axis) of machine tool 10; a drive axis data storing part 118 configured to obtain a physical quantity (such as the position and current) of drive axis 14 as time-series data from controlling part 116, and store the time-series data; an displaying part 120 configured to convert the time-series data into a predetermined indication form, and display the data as at least one displayed waveform. Numerical controller 112 also has a selecting part 122 configured to allow an operator 30 to select the waveform displayed on displaying part 120 by input operation; a sound converting part 124 configured to convert the waveform selected by selecting part 122 into sound conversion data, a type of which is capable of being output as sound; and a sound outputting part 126 configured to output the sound conversion data, generated by sound converting part 124, as sound. The second embodiment is different from the first embodiment in that a simulating part 128 is arranged, for executing a simulation in relation to the time-series data from drive axis controlling part 16 or drive axis data storing part 118.

Figure 5:
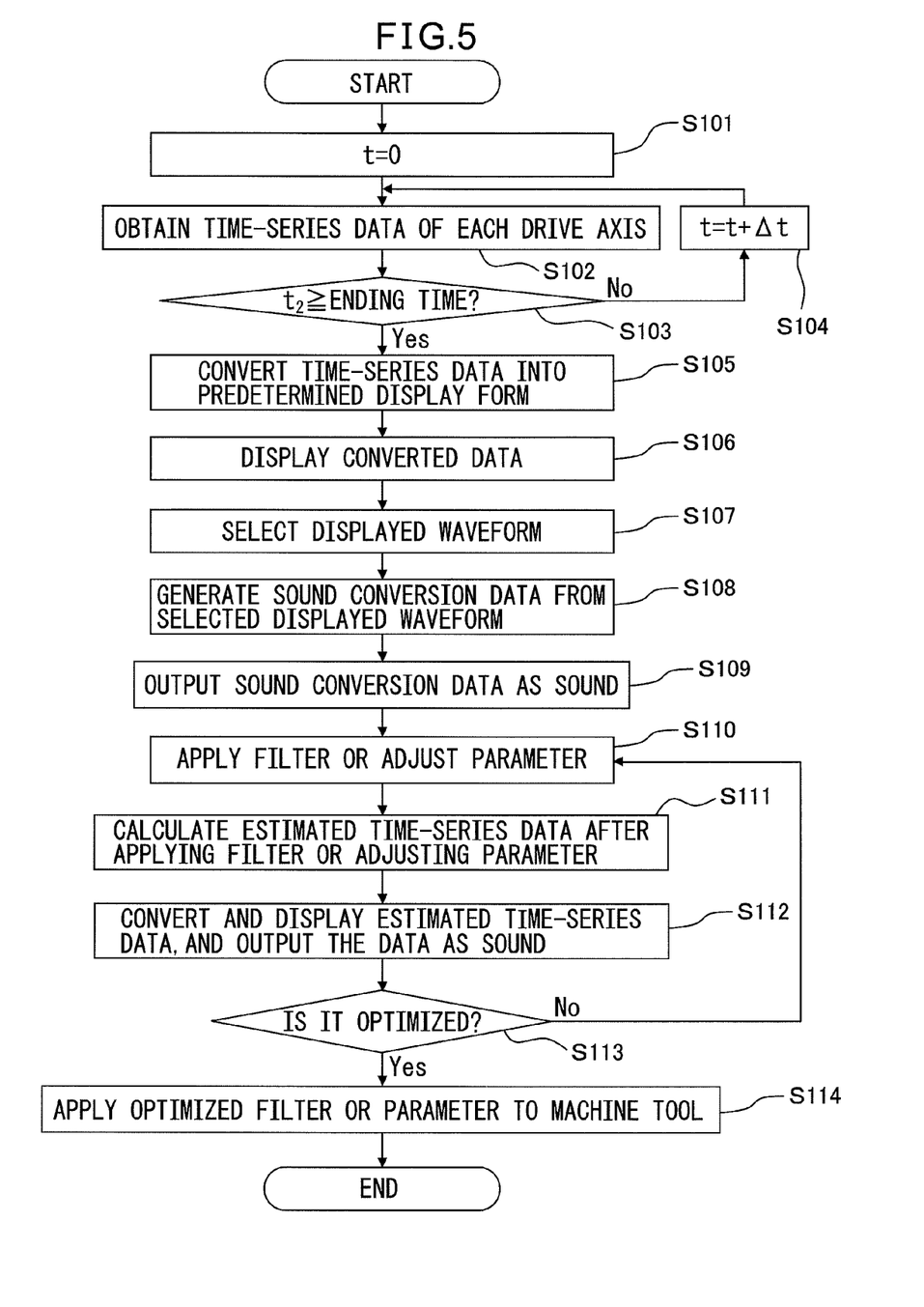
FIG. 5 shows a flowchart explaining the procedure in the second embodiment.

Next, the procedure by means of numerical controller 112 is explained with reference to FIGS. 5 and 6. First, a time point "t" is set to zero (step S101), and a time-series data of physical quantities such as the position, the speed, the acceleration, and/or the current of each drive axis, are obtained (step S102). The process of step S102 is repeated until time point t reaches a predetermined ending time point (steps S103 and S104).

Figure 6:
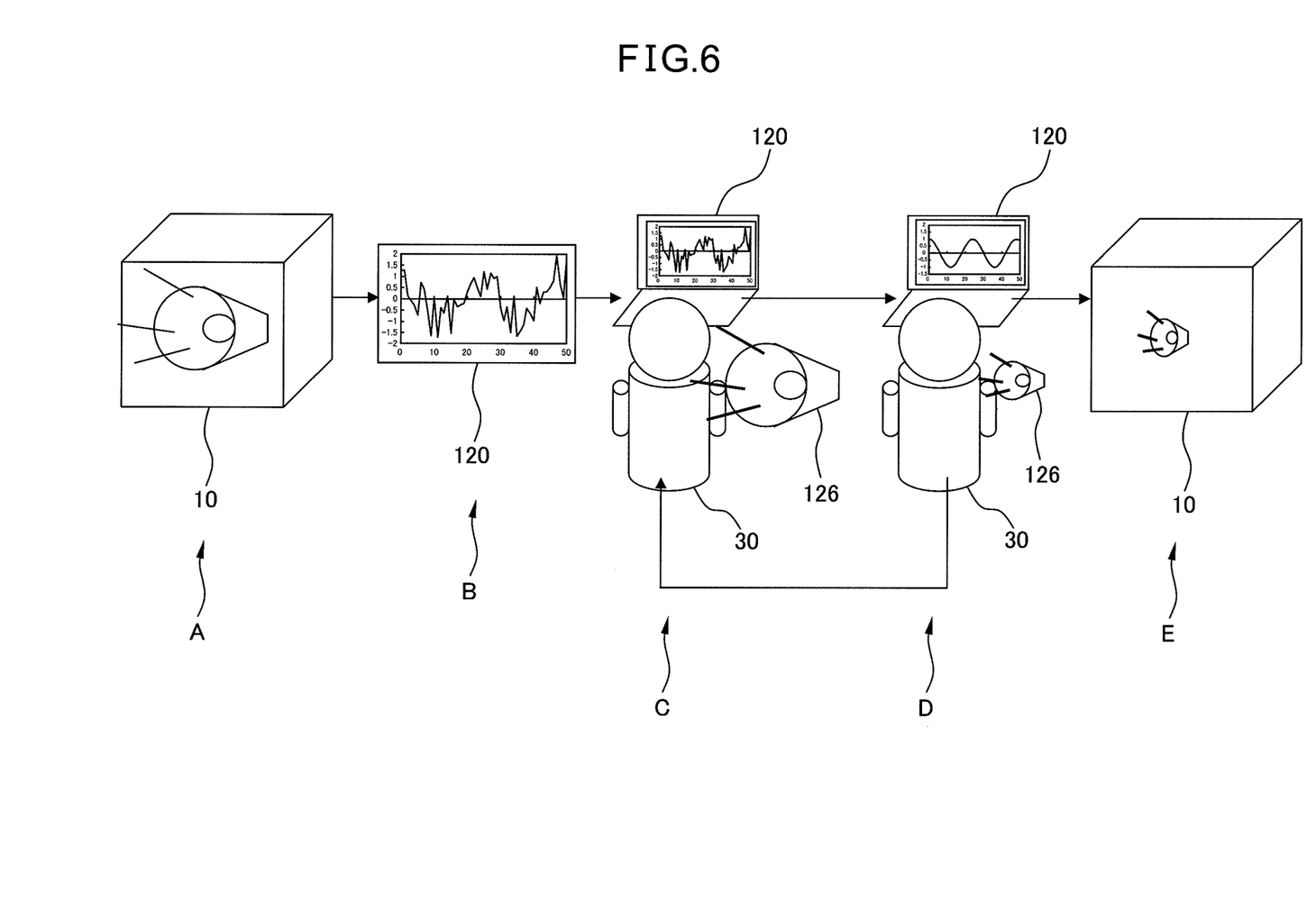
FIG. 6 shows an example wherein an operator adjusts a parameter by using the numerical controller of the second embodiment.

Then, in order to display the time-series data obtained from each drive axis on displaying part 120, the time-series data is converted into a predetermined indication form (step S105), and the converted time-series data is displayed on displaying part 120 in the shape of a graph or the like (step S106 and sections "A" and "B" of FIG. 6).

Next, the operator carries out input operation with respect to selecting part 122, so as to select a waveform displayed on displaying part 120 (step S107). This selection may include selecting at least one waveform from a plurality of displayed waveforms, and selecting a partial region of one waveform. Therefore, the "selected displayed waveform" used in the present invention may include at least one waveform selected from a plurality of displayed waveforms, and the partial region extracted from one waveform.

Next, based on the selected displayed waveform, sound conversion data, capable of being output as sound, is generated (step S108), and then the sound conversion data is output as sound (step S109 and section "C" of FIG. 6).

In the next step S110, the operator applies a filter to the obtained data or adjusts the parameter, based on the displayed waveform or the output sound. In general, when oscillation or resonation occurs in the machine tool, filtering process may be carried out in order to reduce the oscillation or resonation. As a method for ascertaining the effect of the filtering process, the frequency analysis may be carried out with respect to before and after the application of the filter, or, an attenuation amplitude of the machine sound due to the application of the filter may be aurally noticed. However, in the latter case, the operator must work in the vicinity of the machine tool. Therefore, in the present invention, the operator applies the filter to the obtained data or adjusts the parameter, and then simulating part 128 calculates the estimated time-series data which is expected after the application of filter or after the adjustment of the parameter (step S111).

In the next step S112, similarly to the procedure of steps S105 to S109, converting the estimated time-series data into a predetermined indication form, displaying of the converted data, selecting by the operator, generating sound conversion data, and outputting the sound conversion data, are carried out. By virtue of this, the operator can visually and aurally ascertain the condition after the application of the filter or after the adjustment of the parameter.

When it is judged that the filter or the parameter is optimized, for example, when a result by the frequency analysis of the obtained displayed waveform is generally equivalent to that of the machine tool in a normal state, or when the frequency or the volume (amplitude) of the output sound converted from the displayed waveform is generally equal to that of the machine tool in the normal state, the optimized filter or parameter is applied to the machine tool, and then the procedure is terminated (steps S113 and S114, and section "E" of FIG. 6). On the other hand, when the filter or the parameter is not optimized or insufficiently optimized, the procedure is returned to step S110 in order to carry out the application of the filter and the adjustment of the parameter again (step S113 and sections "C" and "D" of FIG. 6).

Figure 7:
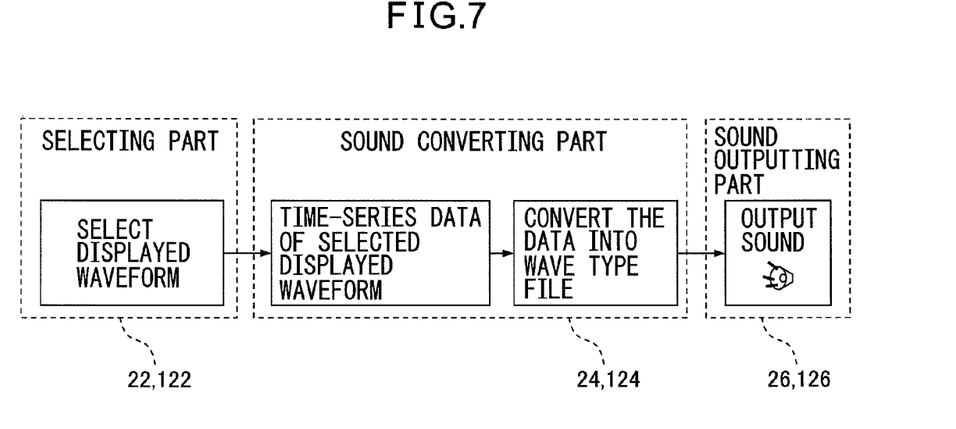
FIG. 7 shows an example of converting sound data.

FIG. 7 shows an example wherein the sound conversion data is generated. As shown, the time-series data of the displayed waveform, selected by selecting part 22 or 122, is converted by sound converting part 24 or 124 into the sound conversion data such as WAVE or MP3 type, which is capable of being output as sound, and then is output by sound outputting part 26 or 126, as the sound. For example, the WAVE type is used, a WAVE file is generated based on the time-series data, a sampling rate and a quantization bit rate (or resolution capability), and the WAVE file may be output or reproduced as sound, by means of an audio means capable of reproducing the sound.

Figure 8:
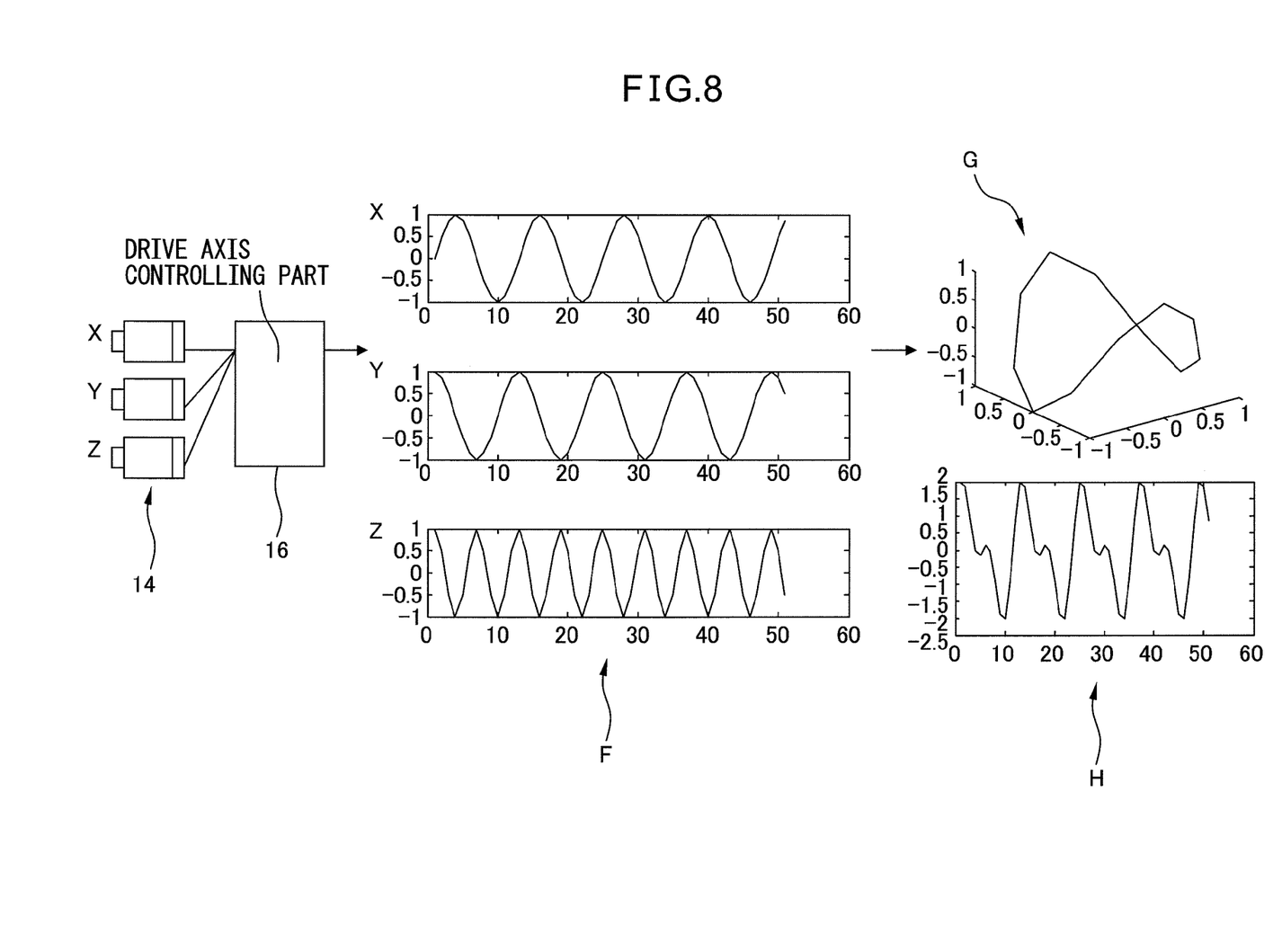
FIG. 8 shows an example of synthesizing sound data.

FIG. 8 shows an example of synthesizing sound data, wherein position data is obtained from three (X, Y and Z) axes 14, and the obtained data is overlapped with each other so as to generate the synthesized sound data. As shown in section "F" of FIG. 8, when each of X, Y and Z axis performs reciprocating motion, position data of a representative point (for example, a tool center point) of the machine tool, moved by the three axes, represents a three-dimensional trajectory as shown in section "G" of FIG. 8. The machine sound, generated when the representative point is moved along the three-dimensional trajectory, includes characteristic frequency and amplitude. Since the physical quantities of each axis include these characteristic values, it is thought that synthesized sound, similar to the machine sound, can be reproduced by synthesizing the sounds generated by the position data of X, Y and Z axes 14. When the trajectory of the tool center point is calculated based on the position data obtained from the plurality of axes, as shown in section "H" of FIG. 8, the position data of the plurality of axes is synthesized, the synthesized data is converted into sound data of the trajectory of the tool center point, and the sound data is used to adjust the machine tool. In this regard, the operator may select all position data of the axes constituting the three-dimensional trajectory on the displaying part, and generate the sound data of the trajectory by using a sound synthesizing method. Otherwise, the operator may select two or more kinds of data including current data, etc., as well as the position data of the axes constituting the three-dimensional trajectory, so as to generate synthesized sound data.

Figure 9:
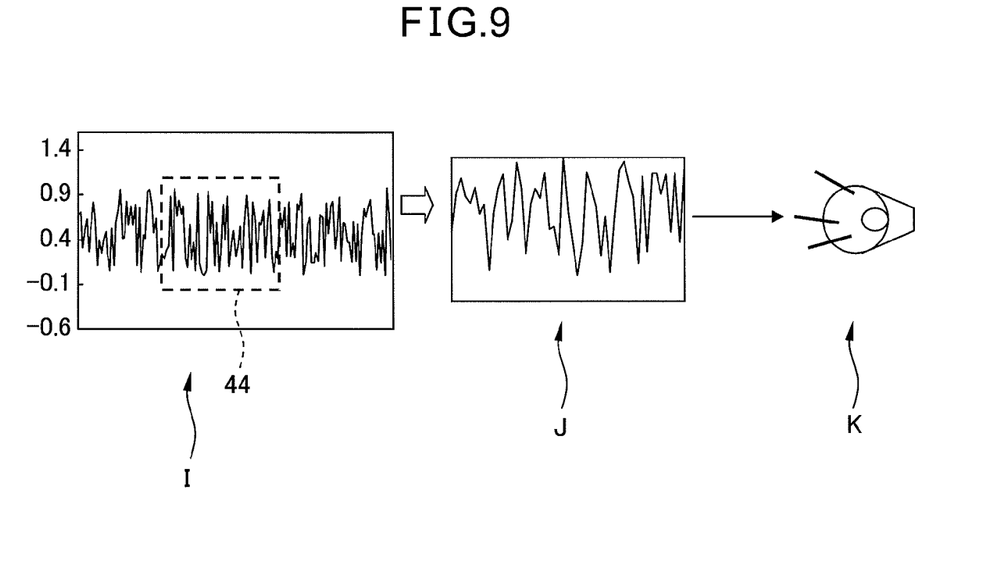
FIG. 9 shows an example wherein a range of generated sound conversion data is determined.

FIG. 9 shows an example wherein a range of the generated sound conversion data is determined. As indicated by a dot line 44 in FIG. 9, by selecting a partial region of the displayed waveform, only the selected region may be converted into sound conversion data and output as sound. In the example of FIG. 9, the partial region of the waveform is selected by defining a tetragon 44 by means of a pointing device or a touch panel (not shown) (section "I" of FIG. 9), the selected waveform is converted into the sound data (section "J" of FIG. 9), and then is output as the sound (section "K" of FIG. 9).

In the present invention, when the data obtained the drive axis is converted into the sound, only a particular frequency may be emphasized by frequency analysis, whereby a particular sound, such as resonance frequency, may be provided to the operator. For example, as shown in equation (1) below, f(k) is calculated by discrete Fourier transform, wherein "N" is the number of data f(n) obtained at a predetermined sampling period T. Then, as shown in equation (2), by multiplying calculated f(k) by a predetermined magnification (for example, "D"), f'(k) having a D-times amplitude is calculated. Further, as shown in equation (3), by calculating inverse discrete Fourier transform of f'(k), sound data, wherein sound only at a particular frequency is emphasized (or amplified by an arbitrary magnification), may be obtained.

$$f(k) = \sum_{n=0}^{N-1} f(n) \cdot e^{-j2\pi nk/N} \quad (1)$$

$(0 \leq n \leq N-1, 0 \leq k \leq N-1)$ $$f'(k) = Df(k) \quad (2)$$

$$f'(n) = \sum_{k=0}^{N-1} f'(k) \cdot e^{j2\pi nk/N} \quad (3)$$

When the frequency of the sound is not within an audible range of a human, the operator cannot hear the sound. Therefore, by shifting the frequency of the obtained data to the audible range, the sound out of the audible range can be heard. For example, equation (4) represents a discrete Fourier coefficient wherein "N" is the number of data f(n) obtained at a predetermined sampling period T, and "k" is shifted by a constant "a." Then, as shown in equation (5), by calculating inverse discrete Fourier transform of f(k−a), sound data, wherein the frequency is shifted by constant "a," may be obtained.

$$f(k-a) = \sum_{n=0}^{N-1} f(n) \cdot e^{j2\pi na/N} \cdot e^{-j2\pi nk/N} \quad (4)$$
$$= \sum_{n=0}^{N-1} f'(n) \cdot e^{-j2\pi nk/N}$$

$(0 \leq n \leq N-1, 0 \leq k \leq N-1)$ $$f'(n) = \sum_{k=0}^{N-1} f(k-a) \cdot e^{j2\pi nk/N} \quad (5)$$

According to the present invention, by converting the waveform displayed on the display into the sound by using the acoustic technique, the oscillation waveform or the resonation waveform may be remotely utilized as the oscillation sound or the resonation sound.

By simulating the effect of adjusting the filter or the parameter on the displayed waveform, more effective adjustment may be carried out.

By synthesizing two or more displayed waveforms and generating the sound synthesized data, the sound, wherein waveforms of a plurality of drive axes are synthesized, may be reproduced.

By selecting the partial region of the displayed waveform and converting only the partial region into the sound conversion data, only information required by the operator may be effectively extracted, and the processing time may be reduced.

By multiplying the amplitude at a predetermined frequency by a certain magnification or shifting the frequency by a certain constant, the operator can clearly recognize information that the operator wants to know.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A numerical controller for a machine tool, comprising:
a drive axis controlling part configured to control a drive axis of the machine tool;
a drive axis data storing part configured to obtain a physical quantity of the drive axis as time-series data, and store the time-series data;
a displaying part configured to convert the time-series data into a predetermined indication form and display the data as at least one displayed waveform;
a selecting part configured to select the waveform displayed on the displaying part by input operation;
a sound converting part configured to convert the waveform selected by the selecting part into sound conversion data, a type of which is capable of being output as sound; and
a sound outputting part configured to output the sound conversion data, generated by the sound converting part, as sound.

2. The numerical controller as set forth in claim 1, further comprising a simulating part configured to estimate time-series data obtained when a parameter relating to the control of the drive axis is changed, based on the parameter before being changed, and calculate the time-series data as estimated time-series data, wherein the displaying part converts the estimated time-series data calculated by the simulating part into a predetermined display form, and displays the converted data as a displayed waveform.

3. The numerical controller as set forth in claim 1, wherein the sound converting part generates synthesized sound data by synthesizing two or more displayed waveforms selected by the selecting part.

4. The numerical controller as set forth in claim 1, wherein the selecting part is capable of selecting a partial region of the displayed waveform displayed on the displaying part, and the sound converting part converts only the partial region of the displayed waveform selected by the selecting part into sound conversion data.

5. The numerical controller as set forth in claim 1, wherein the sound converting part generates sound conversion data wherein an amplitude of a predetermined frequency is changed with a predetermined magnification by using frequency analysis.

6. The numerical controller as set forth in claim 1, wherein the sound converting part generates sound conversion data wherein a frequency of the sound conversion data is arbitrarily shifted by using frequency analysis.

7. The numerical controller as set forth in claim 1, wherein the selected displayed waveform includes at least one waveform selected from a plurality of waveforms displayed on the displaying part.

8. The numerical controller as set forth in claim 1, wherein the physical quantity includes at least one of a position or a current of the drive axis.

* * * * *